(12) United States Patent
Jones et al.

(10) Patent No.: US 7,510,240 B2
(45) Date of Patent: Mar. 31, 2009

(54) VEHICLE SEAT SYSTEM

(75) Inventors: Davey J. Jones, Lenoir City, TN (US);
William D. Ruth, Lenoir City, TN (US);
David Lyscas, Maryville, TN (US)

(73) Assignee: CVG Management Corporation, New Albany, OH (US)

( * ) Notice: Subject to any disclaimer, the term of this patent is extended or adjusted under 35 U.S.C. 154(b) by 265 days.

(21) Appl. No.: 11/263,763

(22) Filed: Oct. 31, 2005

(65) Prior Publication Data

US 2007/0096513 A1    May 3, 2007

(51) Int. Cl.
*B60R 21/00* (2006.01)

(52) U.S. Cl. ............................. 297/216.19; 297/216.17

(58) Field of Classification Search ............ 297/216.16, 297/216.17, 216.19, 216.1, 216.2; 248/421
See application file for complete search history.

(56) References Cited

U.S. PATENT DOCUMENTS

| | | | | |
|---|---|---|---|---|
| 3,198,473 | A * | 8/1965 | Holz | 248/567 |
| 3,811,727 | A * | 5/1974 | Rumpel | 297/468 |
| 3,957,304 | A * | 5/1976 | Koutsky et al. | 297/468 |
| 4,025,110 | A * | 5/1977 | Poorman | 297/468 |
| 5,501,509 | A | 3/1996 | Urrutia | |
| 5,542,638 | A | 8/1996 | Smith | |
| 5,642,916 | A * | 7/1997 | Dybro et al. | 297/216.18 |
| 6,340,152 | B1 | 1/2002 | Ritchie et al. | |
| 6,371,456 | B1 | 4/2002 | Ritchie et al. | |
| 6,481,777 | B2 | 11/2002 | Mans | |
| 6,767,055 | B1 | 7/2004 | Sparks | |
| 6,824,212 | B2 | 11/2004 | Malsch et al. | |
| 6,830,297 | B2 | 12/2004 | Gordon | |
| 6,866,236 | B2 | 3/2005 | Mullinix et al. | |
| 6,886,889 | B2 | 5/2005 | Vits et al. | |
| 6,893,037 | B1 | 5/2005 | Galasso | |
| 6,957,853 | B2 | 10/2005 | Williams et al. | |

OTHER PUBLICATIONS

49 CFR § 571.207, Seating Systems, Nat'l Highway Traffic Safety Admin., Dot, 49 CFR Ch. V (Oct. 1, 2001 Edition), pp. 473-475.
49 CFR § 571.210, Seat Belt Assembly Anchorages, Nat'l, Highway Traffic Safety Admin., Dot, 49 CFR Ch. V (Oct. 1, 2001 Edition), pp. 568-572.
49 CFR § 571.222, School Bus Passenger Seating and Crash Protection, Nat'l Highway Traffic Safety Admin., Dot, 49 CFR Ch. V (Oct. 1, 2001 Edition), pp. 666-678.
C.E. White Co., web pages regarding Product Information, Standard Pedestal Bases, and Seat Schematic, 4 pages, published prior to Oct. 31, 2004.

* cited by examiner

*Primary Examiner*—Milton Nelson, Jr.
(74) *Attorney, Agent, or Firm*—Fitch, Even, Tabin & Flannery (57) ABSTRACT

A vehicle seating system in which a seat belt restraint assembly may be secured directly to the seat. The vehicle seating system includes generally a seat and a base assembly that supports the seat. The base assembly may be a suspension base assembly or a pedestal base assembly. The construction of the base assembly provides the vehicle seating system with sufficient strength so that the system satisfies load testing requirements and provides comfort to the occupant.

The base assembly includes a stop operating at the forward portions of the base assembly to limit forward pivoting movement of the seat upon sudden deceleration. The suspension base assembly may also include dual thickness arms, internal tethers, and vertical supports at the rear of the assembly to strengthen the assembly. The pedestal base assembly may also include telescoped tubes to strengthen the assembly.

13 Claims, 9 Drawing Sheets

VEHICLE SEAT SYSTEM

FIELD OF THE INVENTION

This invention relates to a vehicle seating system, and more particularly, to a vehicle seating system with enhanced structural features to accommodate a seat belt restraint system carried by the seat frame.

BACKGROUND OF THE INVENTION

The conventional seat belt restraint system includes a shoulder portion and a lap portion. One end of the shoulder portion is commonly attached to the frame of the vehicle at a location adjacent the occupant's shoulder. This is true, for example, with respect to buses and bus driver seats. By attaching the shoulder belt to the vehicle body, the vehicle body, rather than the vehicle seat, absorbs a relatively significant portion of the loads to which the occupant is exposed during a sudden deceleration of the vehicle.

The seats and seat belt assemblies must comply with the Federal Motor Vehicle Safety Standards (FMVSS). These standards have been developed to help minimize the possibility of the failure of seat and restraint designs by the forces acting on them as a result of a sudden deceleration or vehicle impact. For example, FMVSS 571.210 currently requires a seat and seat belt assembly for many vehicles to withstand forces in excess of 3,000 pounds applied to the shoulder belt and lap belt portions of the seat belt. Further, FMVSS 571.222 establishes occupant protection requirements for school bus passenger seating and restraining barriers, and SAE J2287 addresses design and performance standards for seats with integrated lap and shoulder restraints.

It would be desirable to attach the upper end of the shoulder belt to the frame of the seat, instead of to the frame of the vehicle. This position would render the shoulder belt more comfortable to the occupant and would facilitate the installation of the seat and the accompanying belts within a vehicle. The shoulder belt would not tend to chafe the neck of the occupant, as may arise when the seat belt is attached to the frame of the vehicle, due to such factors as the height of the occupant, the unevenness of the road, or whether the individual desires to recline in the seat. These considerations make wearing of a seat belt uncomfortable.

However, loading tests to which vehicle seats are commonly subjected require that a frame of the seat be much stronger when a shoulder belt is attached to the seat frame than is the case when the shoulder belt is attached to the vehicle body. Previous efforts to render the seat frame stronger have resulted in designs that are too bulky, heavy, or costly to be practical from a manufacturing standpoint. Further, previous efforts have focused on making the seat itself stronger, rather than the seat base assembly that supports the seat.

Thus, it is desirable to design a lightweight vehicle seating system, including seat base assembly, that allows a restraint assembly to be attached to the vehicle seating system itself.

DESCRIPTION OF THE PREFERRED EMBODIMENTS

The present invention relates generally to a vehicle seating system 1 in which a seat belt restraint assembly may be secured directly to the seat 60 and not the vehicle. The vehicle seating system includes 1 generally a base assembly 2 and a seat 60. The base assembly 2 supports the seat 60 for movement relative to the floor of the vehicle along a generally vertical path. The seat 60 includes a substantially horizontally disposed bottom portion 62 upon which a seat cushion 68 is secured and a backrest portion 64 to which a back cushion 70 is secured. The seat 60 is mounted on the base assembly 2, which is, in turn, secured to the floor of the vehicle. The construction of the base assembly 2 and seat 60 provides the vehicle seating system 1 with sufficient strength so that the system 1 satisfies FMVSS load testing requirements and provides comfort to the occupant. One way that the system 1 satisfies the FMVSS requirements is through use of a stop operating at the forward portions of the base assembly 2 to limit pivoting movement of the seat 60 upon sudden deceleration.

The vehicle seating system 1 includes a seat 60 mounted to either a suspension base 3 (FIGS. 1-5) or a pedestal base 40 (FIGS. 6-7), which base is anchored to the vehicle floor. The vehicle seating system 1 has a lightweight construction and may include a reclining assembly for maintaining the seat backrest portion 64 in one of a variety of reclined positions. The restraint assembly, a conventional restraint assembly with a continuous lap and shoulder belt, is directly secured to the seat 60 at both of its ends.

A suspension base assembly 3 is illustrated in FIGS. 1-5. The suspension base assembly 3 is interposed between the seat 60 and the vehicle floor to accommodate movement of the seat 60 relative to the floor between raised and lowered positions. To this end, the suspension base assembly 3 includes a lower base frame 4 which is securable to the floor in a stationary relationship therewith and an upper base frame 10 upon which the seat 60 is mounted. As seen in FIGS. 1-5, the upper base frame 10 has a generally rectangular shape when viewed from above, and the lower base frame 4 has members cooperating to form a six sided rectangular frame box with open walls. Pivotally connected between the upper and lower base frames 4 and 10 are two arm assemblies 20. As the seat 60 is raised or lowered with respect to the vehicle floor, the upper base frame 10 is raised or lowered with respect to the lower base frame 4, as the arm assemblies 20 are permitted to pivot relative to the upper and lower base frames 4 and 10.

The suspension system includes an air spring 16 and two double ended vibration dampers 18 for dampening vertical oscillations of the seat 60 as the vehicle is operated. The embodiment illustrated herein shows two dampers 18, but in other embodiments, only one damper is preferably used. The air spring 16 is secured between portions 17 and 21 of the upper and lower base frames 10 and 4, respectively. If desired, the air spring 16 could be replaced by some other sort of conventional mechanical suspension. Two double ended dampers 18, or shock absorber type devices, are each pinned at one end to a portion of the upper base frame 10. The remaining free ends of the dampers are each pinned to the lower base frame 4. The air spring 16 is located in the general center of the upper and lower base frames 10 and 4. The dampers are located on opposite sides of the air spring 16. The arm assemblies 20, the dampers 18, and the air spring 16 cooperate to provide a suspension system for the seat 60.

Figure 3:
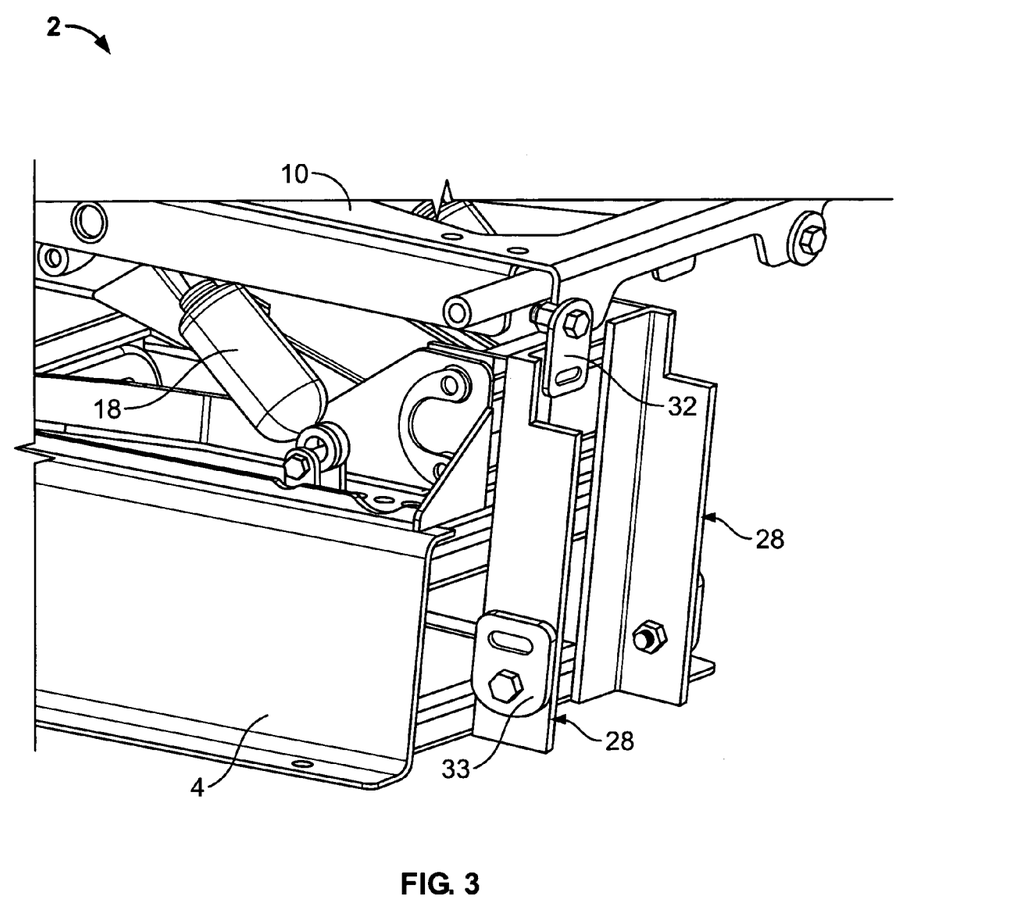
FIGS. 3-5 are partial perspective views of the seat base assembly shown in FIG. 1.
Figure 4:
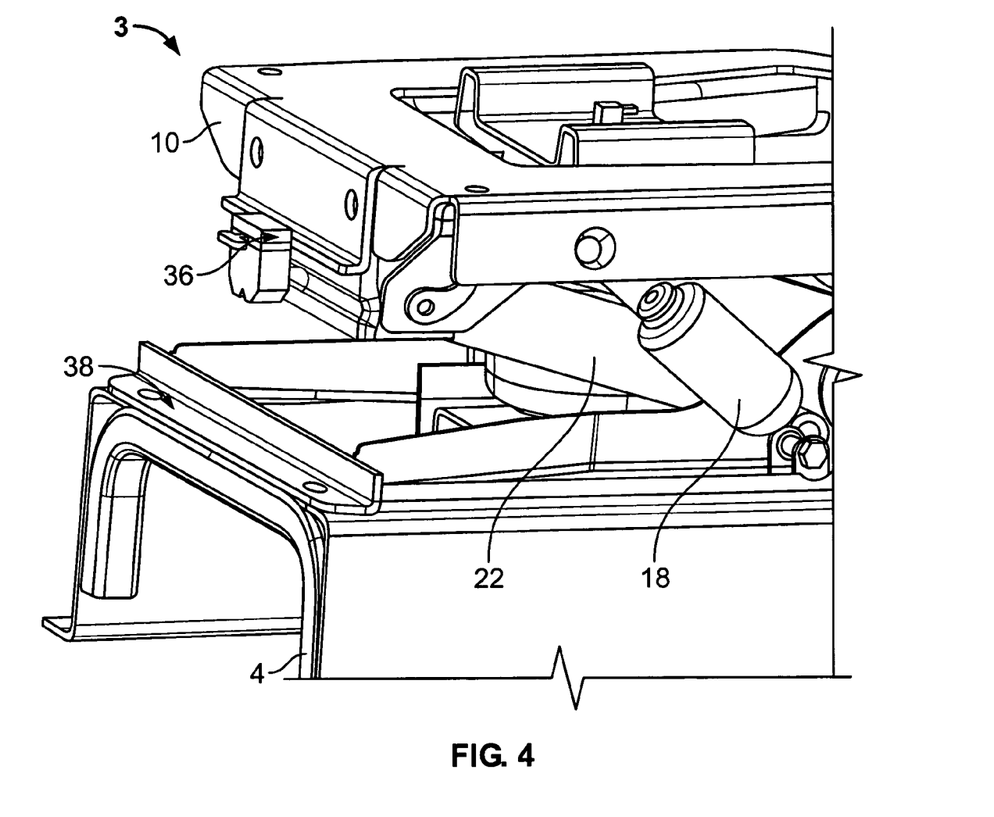
Figure 5:
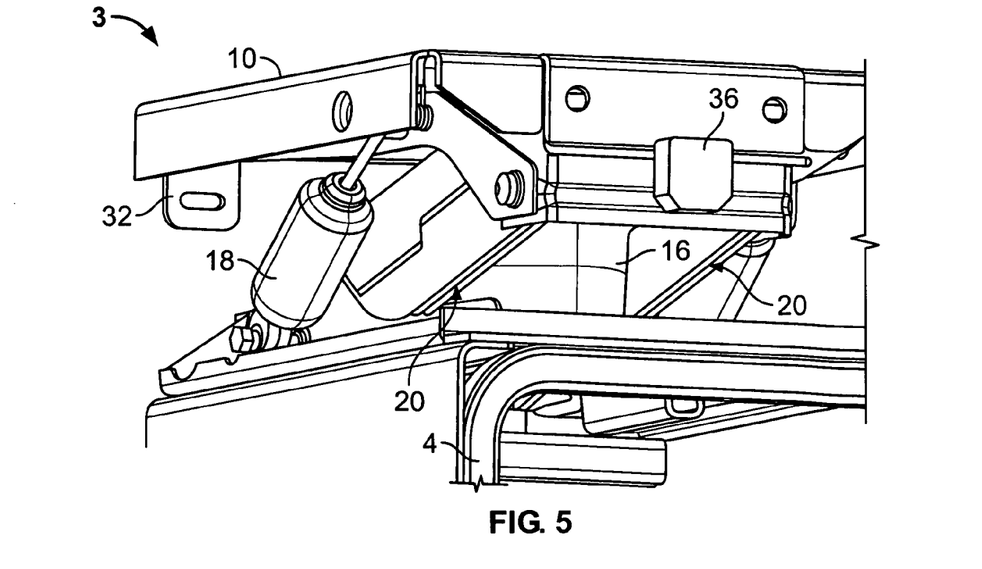

As shown in FIGS. 3-5, the arm assemblies 20 provide a linking system for interconnecting the lower base frame 4 and the upper base frame 10. As can be seen in FIGS. 3-5, the arm assemblies 20 cooperate such that the upper base frame 10 can be shifted vertically up and down with respect to the lower base frame 4. Each arm assembly 20 preferably includes two steel elongated arms 22 that are rigidly secured to one another, such as by welding. The arm assemblies 20 are preferably of increased thickness, such as double thickness, to increase the sturdiness of the suspension base assembly 3.

Figure 1:
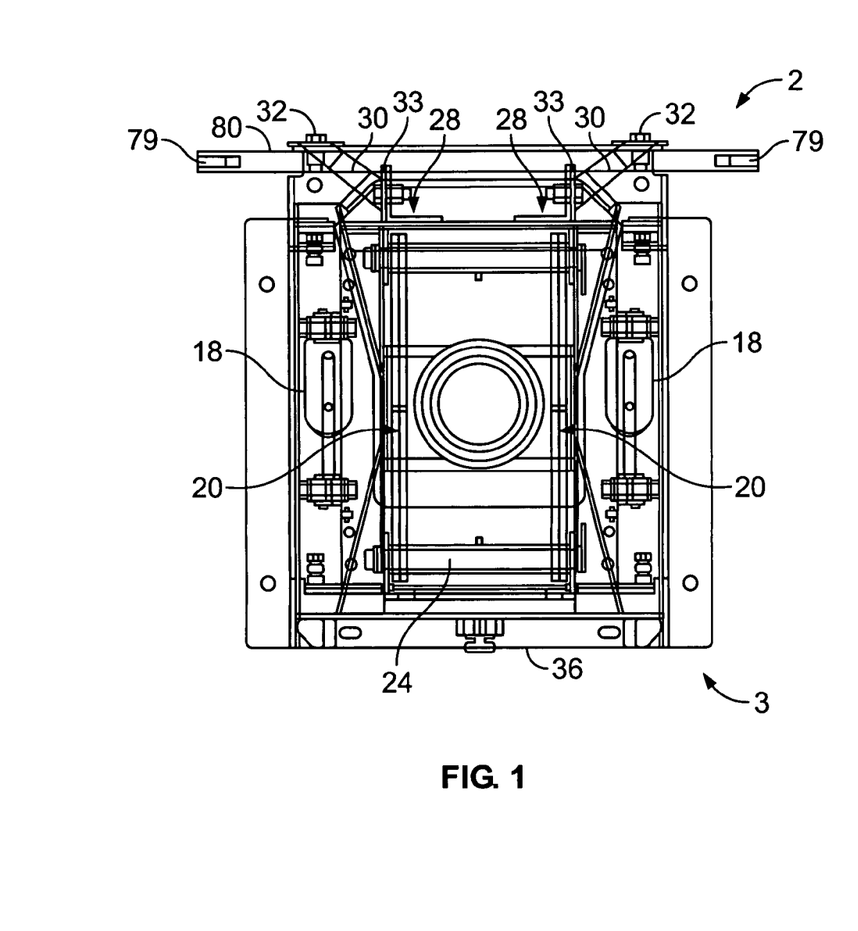
FIG. 1 is a top schematic view of a first embodiment of a seat base assembly of the present invention.

As shown in FIGS. 1 and 5, the arm assemblies 20 are substantially parallel to one another. The forward ends 23 of the arm assemblies 20 are preferably secured to one another at the front of the upper base frame 10 by two pivot pins 24. Also, the rearward ends 25 of the arm assemblies are preferably secured to one another at the rear of the lower base frame 4 by two pivot pins 24. Preferably, each pivot pin 24 is constructed of a high strength steel to resist shear forces to which the pin 24 may be exposed.

The suspension base assembly 3 includes a stop to limit forward pivoting movement of the seat 60 upon sudden deceleration. More specifically, as shown in FIGS. 1, 2, 4, and 5, the suspension base assembly 3 preferably includes a bumper 36 at the front of the upper base frame 10. The bumper 36 is preferably rectangular or square in shape and preferably has a rubber outer surface surrounding a steel core. The bumper 36 acts when the upper base frame 10 moves forwardly and downwardly upon sudden deceleration. Under such circumstances, it impacts a stop surface 38 on the lower base frame 4 and thereby prevents further forwarding pivoting movement by the upper base frame 10 in a forward and downward direction. As seen in FIG. 4, the stop surface 38 is preferably a steel angle located at the top front portion of the lower base frame 4. The bumper 36 and stop surface 38 act in conjunction as the stop for the suspension base assembly 3. The distance between the bumper 36 and stop surface 38 in the normal static conditions is coordinated with the suspension system to allow the desired freedom of vertical movement, such as up to four inches, without interference when the vehicle seat system 1 is operating in a normal condition.

Figure 2:
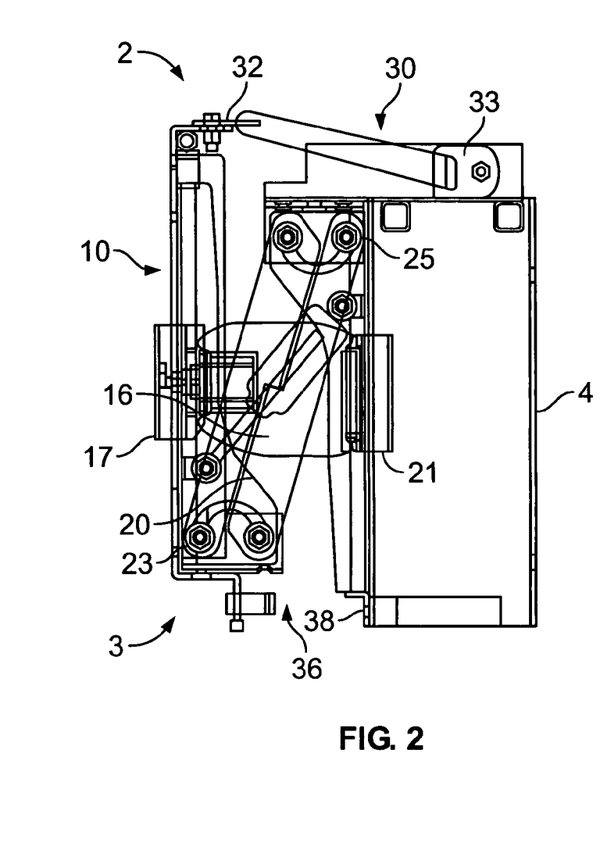
FIG. 2 is a side schematic view of the seat base assembly shown in FIG. 1.

Further, as shown in FIGS. 1-3, two vertical supports 28 are located at the rear of the suspension base assembly 3. The two vertical supports 28 are preferably L-shaped in cross section. As seen in FIGS. 2 and 3, they are secured, as by welding, to the rear of the lower base frame 4 and preferably connected to the pivot pins 24. The vertical supports 28 act in conjunction with internal tethers 30, discussed below, to strengthen the structural integrity of the lower base frame 4. This then cooperates with the forward stop to limit the motion of the upper base frame 10 and to prevent the upper base frame 10 from "diving," i.e., forward pivots during a sudden deceleration above a desirable level.

As shown in FIGS. 1 and 2, the suspension base assembly 3 includes one or more, and preferably two, internal tethers 30 located at the rear of the assembly 3. The internal tethers 30 each extend between openings in a first bracket 32 secured to each side of the rear of the upper base frame 10 and a second bracket 33 secured to each of the vertical supports 28. The internal tethers 30 are preferably composed of a fabric-like, standard seat belt material.

Figure 6:
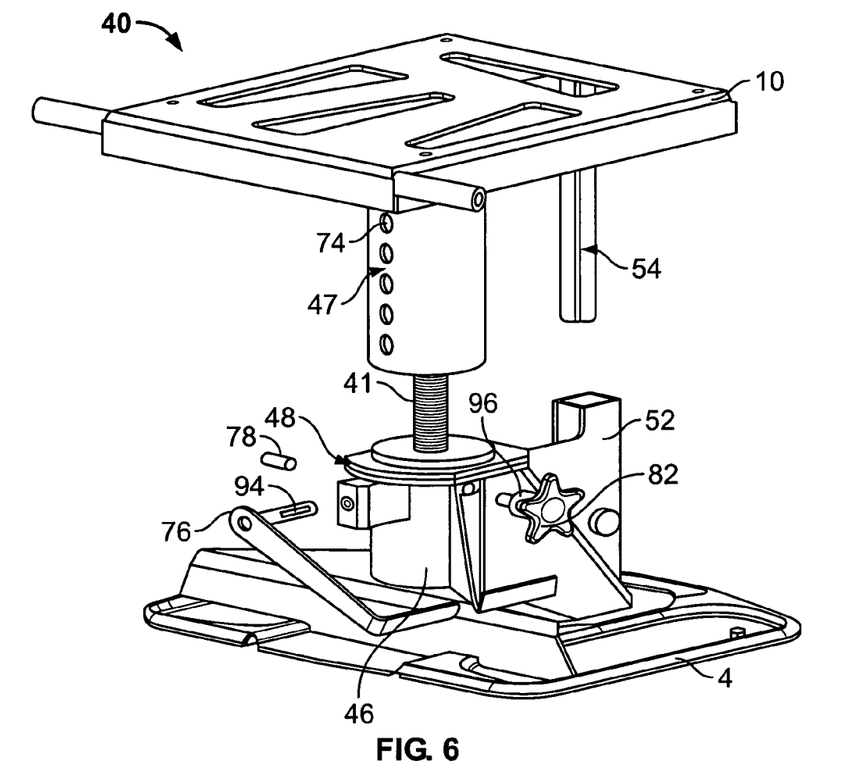
FIG. 6 is a perspective view of a second embodiment of a seat base assembly of the present invention in which the seat base assembly is partially disassembled.
Figure 7:
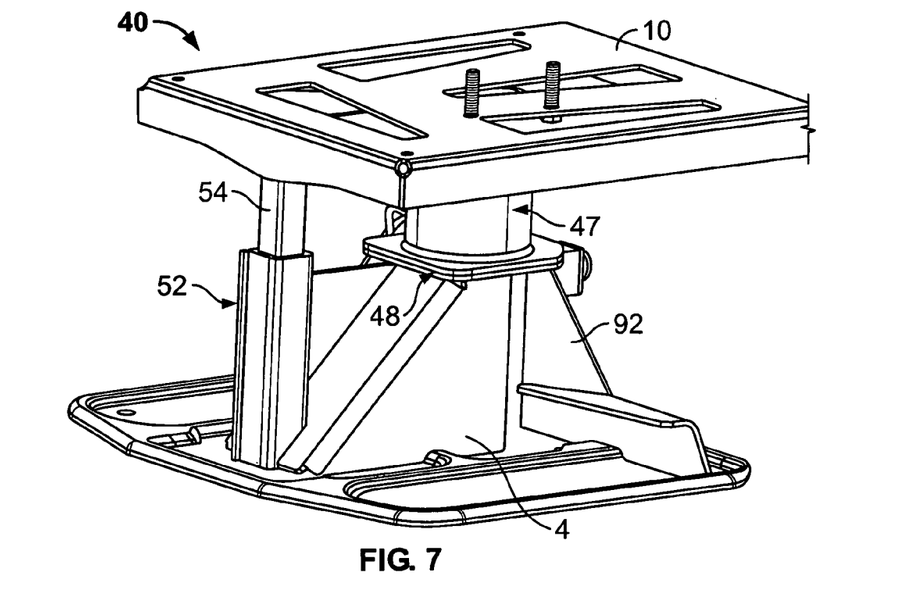
FIG. 7 is a perspective view of the seat base assembly shown in FIG. 6.

A second embodiment of the present invention uses a pedestal base assembly 40, which is illustrated in FIGS. 6-7. The pedestal base assembly 40 includes a lower base frame 4 which is securable to the floor in a stationary relationship therewith and an upper base frame 10 upon which the seat 60 is mounted. More specifically, the bottom portion 62 of a seat 60 is mounted to seat tracks (not shown), which are, in turn, mounted to the upper base frame 10.

As can be seen in FIG. 6, the upper base frame 10 is mounted to two telescopically-engaged sleeve tubes 46 and 47. A first sleeve tube 46, preferably having a circular cross-section, has a larger diameter than, and telescopically engages, a second sleeve tube 47, also preferably having a circular cross-section. The circular cross-section adds strength to the design.

The first sleeve tube 46 is secured to, and extends upwardly from, the lower base frame 4, which is secured to the vehicle floor. The second sleeve tube 47 is secured to, and extends downwardly from, the upper base frame 10 and preferably has thicker walls than the first sleeve tube 46. In contrast to the second sleeve tube 47, the first sleeve tube 46 has a relatively low center of gravity and is supported by generally triangular webs 92 that extend between the floor and the tube 46. The thicker walls help provide the second sleeve tube 47 with sufficient support. During operation of the vehicle, the second sleeve tube 47 is nested within the first sleeve tube 46 and thereby engages the first sleeve tube 46 to limit pivoting movement of the seat 60 in a forwardly and downwardly direction upon sudden deceleration of the vehicle.

The first and second sleeve tubes 46 and 47 therefore cooperate in a manner to strengthen the pedestal base assembly 40 and limit pivoting movement of the seat 60. The assembly 40 is further strengthened by the use of multiple collars 48 that reinforce the strength of the telescopically-engaged first and second sleeve tubes 46 and 47. As shown in FIG. 6 and 7, the collars 48 are disposed about the top end of, and about the outside diameter of, the first sleeve tube 46. The collars 48 reinforce the top end of the first sleeve tube 46 and prevent deformation.

The second sleeve tube 47 is selectively movable with respect to the first sleeve tube 46 between various vertical positions to raise and lower the upper base frame 10 and to thereby operate as part of a height adjustment mechanism. As shown in FIG. 6, the second sleeve tube includes a series of vertically aligned holes 74 to serve as variable height adjustment settings. A first spring 41 is disposed between the lower base frame 4 and the upper base frame 10 within and extends through the first sleeve tube 46. The first spring 41 acts upwardly against the upper base frame 10 and thereby biases the first and second sleeve tubes 46 and 47 apart from one another.

The occupant operates a lever 76 to selectively adjust the vertical height of the seat 60 between the various settings defined by the holes 74 in the second sleeve tube 47. The lever 76 controls the movement of a first pin 94 on the end of lever 76 that is moveable to interconnect the first and second sleeve tubes 46 and 47 via the alignment of holes in the tubes 46 and 47, thereby allowing the first pin 94 to extend therethrough. The first pin 94 is received within one of the holes 74 of the second sleeve tube 47 to set the pedestal base assembly 40 to a specific height.

When the occupant desires to raise or lower the seat 60, the occupant operates the lever 76 causing a second pin 78 to move downward and laterally, thereby causing the first pin 94 to disengage. When the first pin 94 interconnecting the first and second sleeve tubes 46 and 47 is removed, the first spring 41 urges the first and second sleeves 46 and 47 apart, and the first and second sleeves 46 and 47 are moveable with respect to one another to select a new vertical setting. The first spring 41 acts to raise the upper base frame 10 to a higher vertical setting, whereas the occupant must push the frame 10 down to overcome the bias of the first spring 41 to lower the frame 10. When the correct setting is achieved, the first pin 94 may be repositioned to interconnect the first and second sleeve tubes 46 and 47 and to prevent further movement with respect to one another. The first pin 94 may be biased inward through the aligned holes by a second spring to control movement of the first pin 94.

The vertical height adjustment mechanism also preferably includes an adjustable knob 82 that moves a set pin 96, which engages the lower end of second sleeve tube 47 and stabilizes the second sleeve tube 47. The set pin 96 threadingly extends to the second sleeve tube 47. Once the seat 60 is set to its desired height and the first pin 94 is secured, the adjustable knob 82 is turned clockwise to move the set pin 96 into secure contact with the lower end of the second sleeve tube 47.

The pedestal base assembly 40 employs a stop, located in front of the first and second sleeve tubes 46 and 47, to limit the forward pivoting movement of the assembly 40 upon sudden deceleration of the vehicle. The stop includes a second set of tubes, referred to herein as deceleration tubes, that telescopically engage one another. As shown in FIGS. 6 and 7, the first deceleration tube 52 is secured to, and extends upwardly from, the lower base frame 4, which is secured to the vehicle floor. The second deceleration tube 54 is secured to, and extends downwardly from, the upper base frame 10. The first and second deceleration tubes 52 and 54 are preferably square in cross-section with the second deceleration tube 54 having a smaller cross-sectional area to be telescopically received in the first deceleration tube 52. More specifically, during operation of the vehicle, the second deceleration tube 54 is nested within the first deceleration tube 52 and thereby engages and binds on the first deceleration tube 52 to limit forward pivoting movement of the seat 60 upon sudden deceleration of the vehicle.

When the height is adjusted upward or downward, the first and second deceleration tubes 52 and 54 move freely with respect to one another. When the height of the seat 60 is adjusted upward, the second deceleration tube 54 also moves upward, thereby leaving less of the second tube 54 nested within the first tube 52. Conversely, when the height of the seat 60 is adjusted downward, the second deceleration tube moves downward, thereby increasing the amount of the second tube 54 nested within the first tube 52. At all times following installation, a sufficient amount, preferably at least 2.2 inches, of the second tube 54 telescopically engages inside the first tube 52. During ordinary acceleration or deceleration, there is little, if any, binding contact between the first and second tubes 52 and 54. Upon sudden deceleration, however, the first and second tubes 52 and 54 "bind," i.e., frictionally engage one another, thereby acting as a stop and limiting the forward and downward pivoting movement by the pedestal base assembly 40.

Another advantage of both the suspension base assembly 3 and the pedestal base assembly 40 is that both are able to accommodate features of existing vehicles, particularly buses. More specially, the vehicle seating system 1 is able to work with existing external tether locations in the floors of buses. An external tether (not shown) may be attached to outside portions 79 of a belt bar 80 located at the rear of both the suspension base assembly 3 and the pedestal base assembly 40, as shown in FIGS. 1, 3, and 6. The external tether extends from the outside portions 79 of the belt bar 80 to the floor bolt of a vehicle. In the present vehicle seating system 1, the floor bolt can be located nearly directly beneath the outer portions 79 of the belt bar 80. Other designs require floor bolt locations that are behind the vehicle seat system.

Another advantage resulting from the increased sturdiness of both the suspension base assembly 3 and the pedestal base assembly is the increased height adjustment available, in comparison to other belt-to-seat designs. Because the base assembly 2 has a stop and other features that limit pivoting of the vehicle seat system 1, the vehicle seat system may be adjusted through a vertical height adjustment of about four inches. Other belt-to-seat designs do not provide this expanded vertical height adjustment.

In addition, the use of the stop and other features allow the vehicle seating system 1 to resist sudden deceleration forces while remaining relatively lightweight. The weight of the vehicle seat system 1 employing the pedestal base assembly 40 may be as light as about 107 pounds, while the weight of the vehicle seat system 1 employing the suspension base assembly 3 may be as light as 125 pounds.

Figure 8:
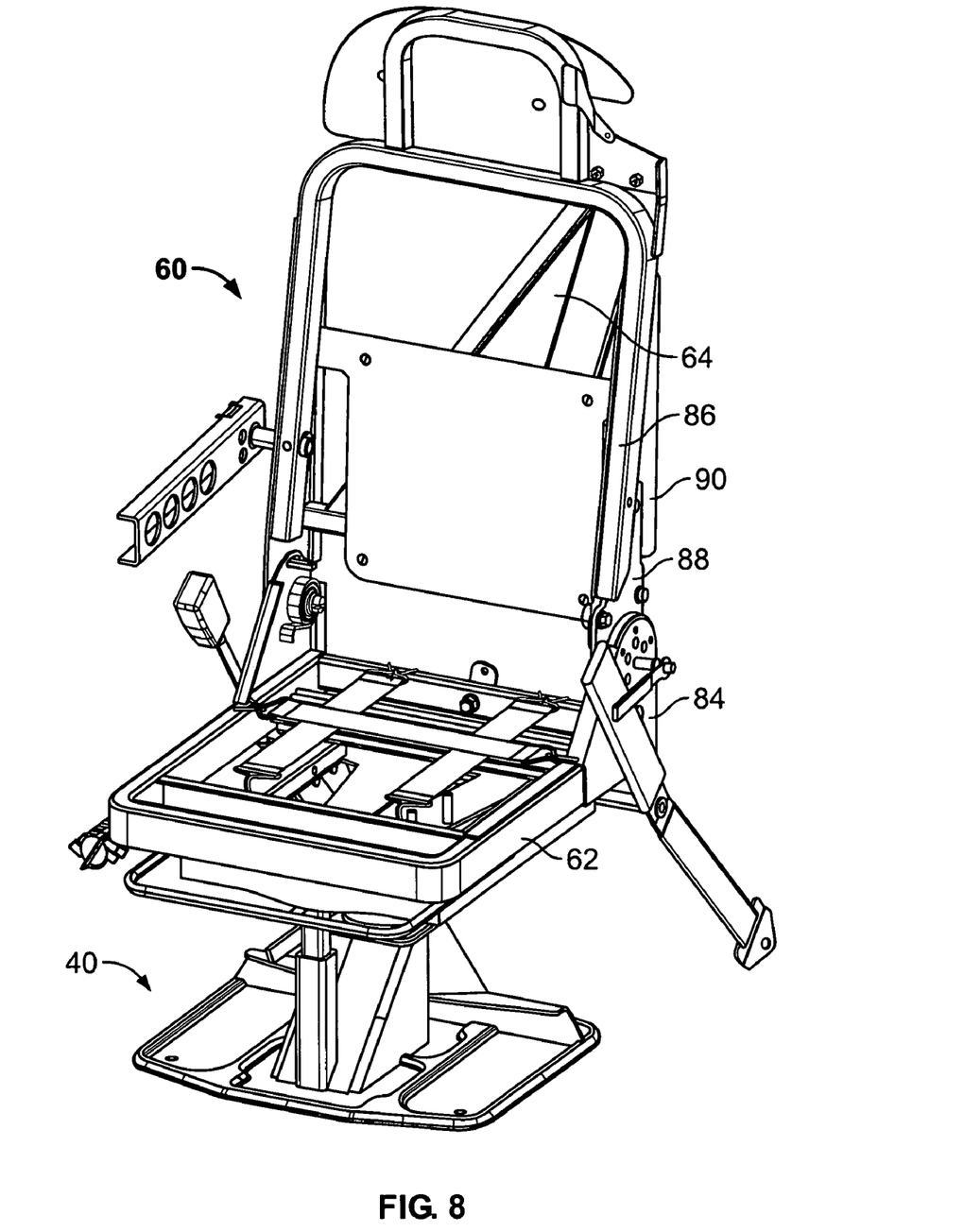
FIG. 8 is a perspective view of an embodiment of the seat of the present invention.
Figure 9:
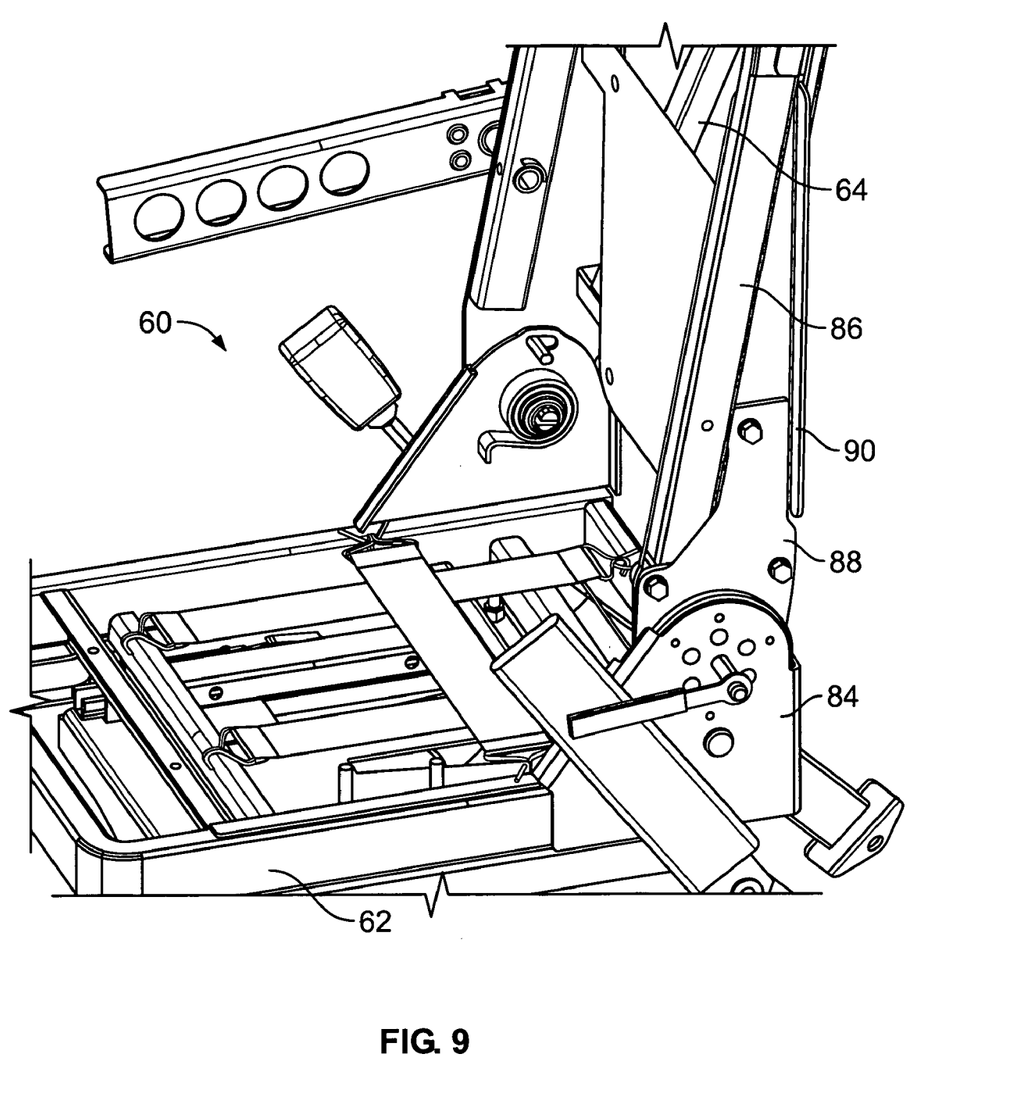
FIG. 9 is a perspective view of the seat of FIG. 8.

As shown in FIGS. 8 and 9, the seat 60 preferably includes a recliner assembly 84 for maintaining backrest portion 64 of the seat 60 in one of a variety of reclined positions. The recliner assembly 84 joins the backrest portion 64 of the seat 60 to the bottom portion 62 in a selectively rotatable manner. The recliner assembly 84 allows the backrest portion 64 to selectively rotate between an upright position and a fully reclined position. The backrest portion 64 rotates about 17 degrees to its fully reclined position.

The seat 60 has been strengthened sufficiently to make it capable of withstanding the loads associated with securing the seat belt to the seat 60, rather than the frame of the vehicle. As shown in FIG. 8, the backrest portion 64 of the seat 60 includes an inverted U-shaped tubular frame 86 that extends about, and defines at least a portion of, the front of the backrest portion 64. A bracket 88 has been mounted adjacent to one end of the tubular frame 86 and sandwiched between the recliner assembly 84 and an elongated backrest reinforcement member 90. As shown in FIGS. 8 and 9, the plate 90 has a generally L-shaped cross-section extends behind the bracket 88, and has a non-L-shaped tail portion that extends downward and is bolted to the bracket 88. The nesting of these components in this manner provides the seat 60 with extra strength and enhances the ability of the seat 60 to withstand the loads arising from sudden deceleration.

Figure 10:
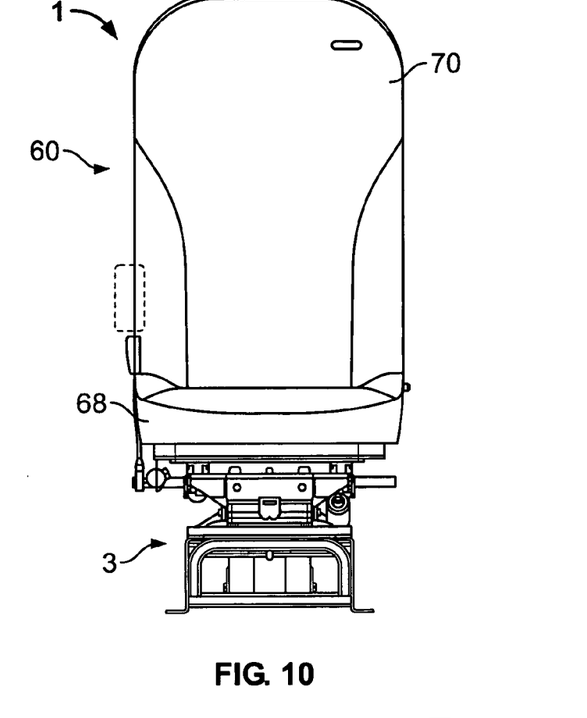
FIG. 10 is a front schematic view of an embodiment of a vehicle seat system of the present invention with the seat base assembly of FIG. 1.
Figure 11:
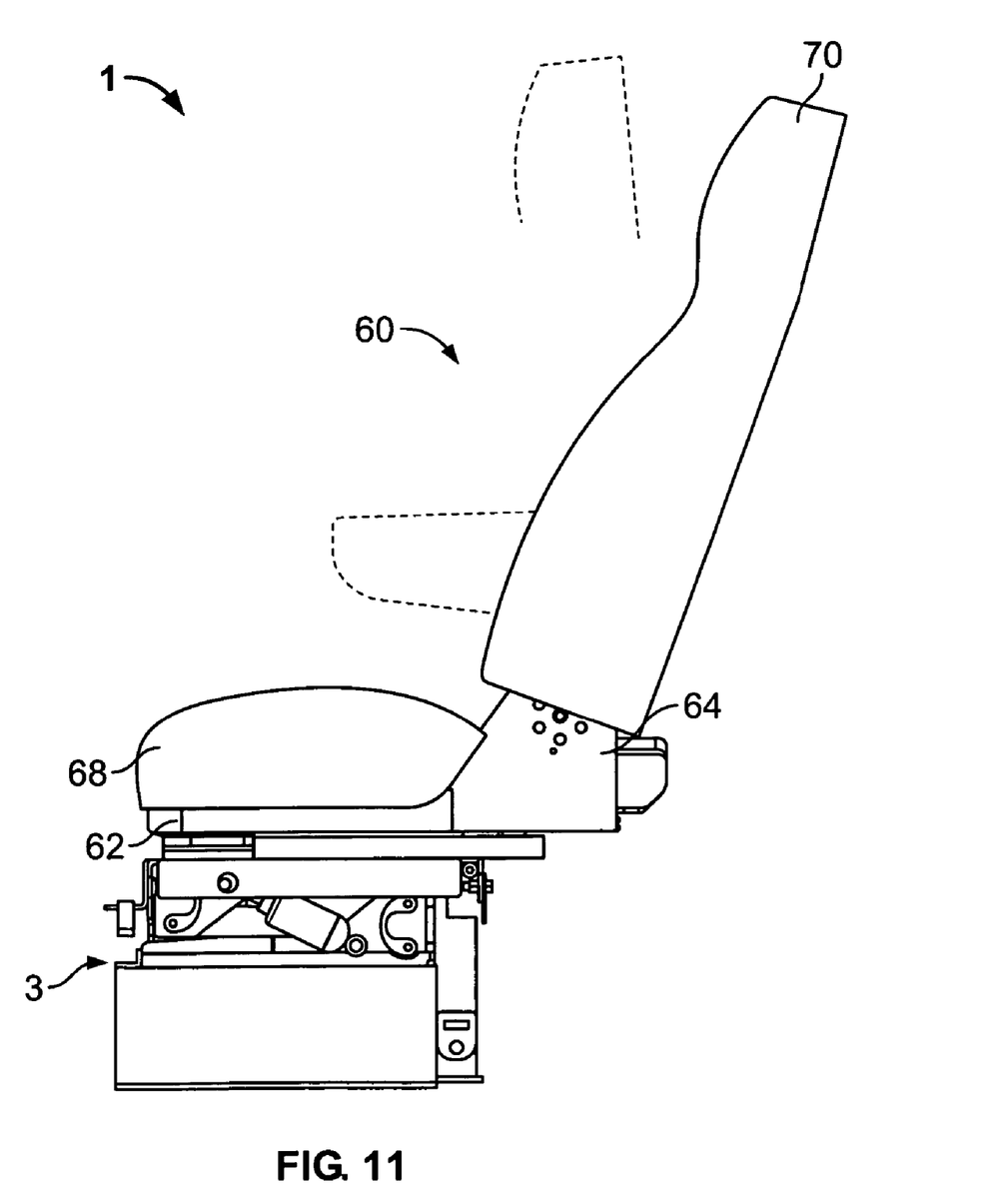
FIG. 11 is a side schematic view of the vehicle seat system of FIG. 10.
Figure 12:
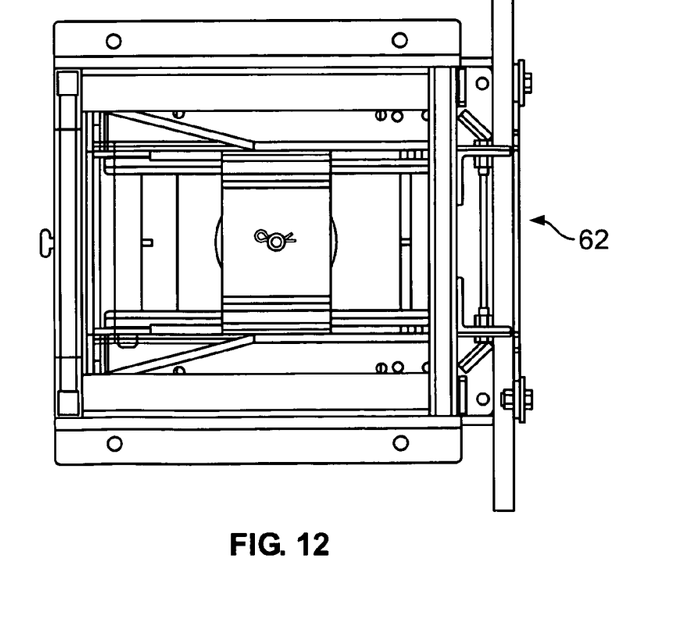
FIG. 12 is a bottom schematic view of the bottom seat portion of the vehicle seat system of FIG. 10.
Figures 13, 14, 15:
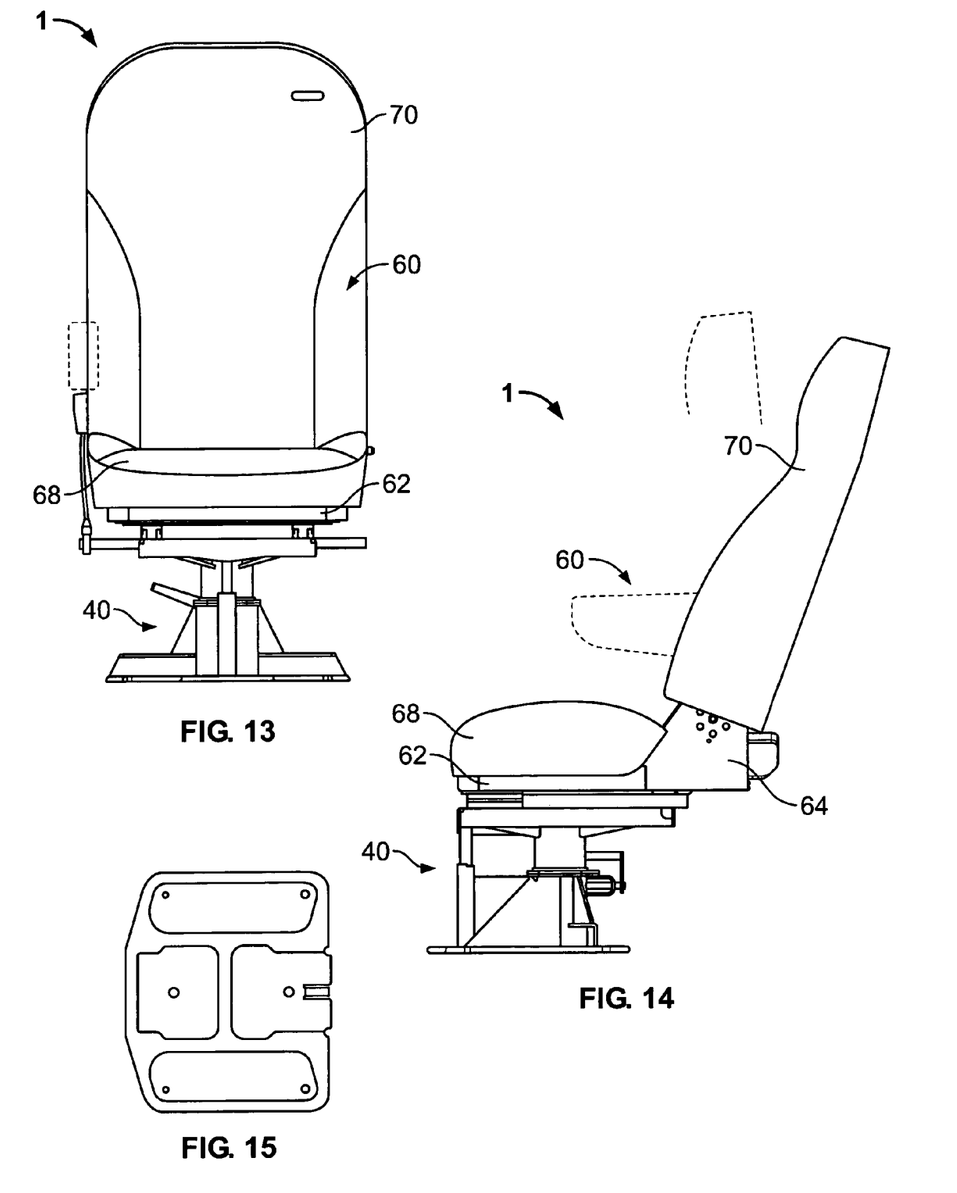
FIG. 13 is a front schematic view of an embodiment of a vehicle seat system of the present invention with the seat base assembly of FIG. 6.
FIG. 14 is a side schematic view of an embodiment of the vehicle seat system shown in FIG. 13.
FIG. 15 is a bottom schematic view of the bottom seat portion of the vehicle seat system of FIG. 13.

Two embodiments of the vehicle seat system 1, and features thereof, are shown in FIGS. 10-15. FIGS. 10-12 show a first embodiment of the vehicle seating system 1 having the suspension base assembly 3 described above. FIGS. 13-15 show a second embodiment of the vehicle seating system 1 having the pedestal base assembly 40 described above.

As shown in FIGS. 10-15, the seat 60 of the vehicle seating system 1 includes the bottom portion 62, the backrest portion 64, the seat cushion 68, and the back cushion 70. The seat cushion 68 and the backrest cushions 70 are affixed to the bottom portion 62 and backrest portion 64 in a conventional manner. The vehicle seating system 1 preferably employs a conventional seat belt restraint assembly having shoulder, lap, and back portions and a retractor for restraining an occupant.

Loading tests have been conducted upon the vehicle seat system, and it withstood the forces to which it was exposed without any appreciable deformation or failure of its components. More specifically, the vehicle seat system withstood forces of about 3,600 pounds applied to the shoulder belt and lap belt portions of the seat belt. Thus, the vehicle seat system complied with the pull test requirements of FMVSS 571.207, section 4.2(c) in effect on Oct. 1, 2004, and supported an upper load in excess of 3,000 pounds applied to the shoulder portion of the integral passenger restrain system and a seat mass load of 20 times the mass of the seat multiplied by 9.8 applied through a center of gravity of the seat, both upper load and the seat mass load being simultaneously held for a duration of 10 seconds. The vehicle seat system retained its integrity when simultaneously supporting upper loads and seat mass loads equal to 120 percent of the pull test requirements of section 4.2(c).

Further, by anchoring the seat belt assembly to the seat 60, the seat belt assembly shifts in conjunction with the seat 60, thereby reducing friction arising from different seating positions and orientations and increasing the comfort of the occupant. In addition, the seat belt assembly can be oriented to better fit the occupant than a seat belt assembly anchored to the vehicle frame, thereby potentially reducing the risk of certain injuries.

The foregoing relates to a preferred exemplary embodiment of the invention. It is understood that other embodiments and variants are possible which lie within the spirit and scope of the invention as set forth in the following claims.

What is claimed is:

1. A vehicle seat system for use with a vehicle, the vehicle seat system comprising:
    a seat assembly having a seat portion and a backrest portion;
    a lower base frame for mounting to a vehicle and having a first forward portion and a first rearward portion;
    an upper base frame for mounting to the seat assembly and having a second forward portion and a second rearward portion;
    a linking system for interconnecting the upper base frame to the lower base frame, the upper frame being moveable relative to the lower frame;
    an integral passenger restraint system associated with the seat assembly; and
    a stop operating at the first forward portion and second forward portion to limit forward pivoting movement of the seat assembly upon loads applied to the seat assembly above a predetermined level;
    wherein the lower base frame comprises a plurality of members defining a bottom portion for mounting to a vehicle and extending generally away from the bottom portion to define a top portion, the stop operating at the top portion to limit forward pivoting movement of the seat assembly.

2. The vehicle seat system of claim 1 wherein the linking system provides a suspension type system and further comprises one or more cooperating arm assemblies to enable the upper base frame to shift toward and away from the lower base frame.

3. The vehicle seat system of claim 2 wherein the stop further comprises a bumper mounted on the second forward portion.

4. The vehicle seat system of claim 3 wherein the stop further comprises a stop surface on the first forward portion to be engaged by the bumper to limit forward pivoting movement of the seat assembly upon loads applied to the seat assembly above a predetermined level.

5. The vehicle seat system of claim 4 wherein the linking system further comprises one or more double ended vibration dampers.

6. The vehicle seat system of claim 5 wherein the linking system further comprises at least one air spring disposed between the upper base frame and the lower base frame.

7. The vehicle seat system of claim 2 wherein one or more of the cooperating arm assemblies has increased thickness relative to other components of the linking system.

8. The vehicle seat system of claim 2 wherein the lower base frame includes at least one support at the first rearward portion extending generally vertically.

9. The vehicle seat system of claim 1 wherein the integral passenger restraint system comprises a lap portion and a shoulder portion, and the vehicle seat system complies with pull test requirements of Federal Motor Vehicle Safety Standard 571.207, section 4.2(c) in effect on Oct. 1, 2004, and supports an upper load of at least 3,000 pounds applied to the shoulder portion of the integral passenger restraint system and a seat mass load of at least 20 times the mass of the seat assembly multiplied by 9.8 applied through a center of gravity of the seat assembly, both the upper load and the seat mass load being simultaneously held for a duration of ten seconds.

10. The vehicle seat system of claim 9 wherein the system retains its integrity when simultaneously supporting upper loads and seat mass loads equal to 120 percent of the pull test requirements of Federal Motor Vehicle Safety Standard 571.207, section 4.2(c) in effect on Oct. 1, 2004.

11. A vehicle seat system comprising:
    a seat assembly having a seat portion and a backrest portion;
    a lower base frame for mounting to a vehicle and having a first forward portion and a first rearward portion;
    an upper base frame for mounting to the seat assembly and having a second forward portion and a second rearward portion;
    a linking system for interconnecting the upper base frame to the lower base frame, the upper frame being moveable relative to the lower frame;
    an integral passenger restraint system associated with the seat assembly; and
    a stop operating at the first forward portion and second forward portion to limit forward pivoting movement of the seat assembly upon loads applied to the seat assembly above a predetermined level;
    wherein the linking system provides a suspension type system and further comprises one or more cooperating arm assemblies to enable the upper base frame to shift toward and away from the lower base frame;
    wherein the lower base frame includes at least one support at the first rearward portion extending generally vertically; and
    wherein the at least one support comprises at least two supports at the first rearward portion extending generally vertically, and both supports having a generally L-shaped cross-section.

12. A vehicle seat system comprising:

a seat assembly having a seat portion and a backrest portion;

a lower base frame for mounting to a vehicle and having a first forward portion and a first rearward portion;

an upper base frame for mounting to the seat assembly and having a second forward portion and a second rearward portion;

a linking system for interconnecting the upper base frame to the lower base frame, the upper frame being moveable relative to the lower frame;

an integral passenger restraint system associated with the seat assembly; and a stop operating at the first forward portion and second forward portion to limit forward pivoting movement of the seat assembly upon loads applied to the seat assembly above a predetermined level;

wherein the linking system provides a suspension type system and further comprises one or more cooperating arm assemblies to enable the upper base frame to shift toward and away from the lower base frame;

wherein the lower base frame includes at least one support at the first rearward portion extending generally vertically; and at least one tether extending between the at least one support and the upper base frame at the second rearward portion to limit movement between the upper base frame and the lower base frame.

13. The vehicle seat system of claim 12 wherein the tether comprises a fabric material.

* * * * *